US010468981B2

(12) United States Patent
Nakata

(10) Patent No.: US 10,468,981 B2
(45) Date of Patent: Nov. 5, 2019

(54) SWITCHING POWER SUPPLY DEVICE

(71) Applicant: DENSO CORPORATION, Kariya, Aichi-pref. (JP)

(72) Inventor: Shinichiro Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/289,287

(22) Filed: Oct. 10, 2016

(65) Prior Publication Data
US 2017/0207699 A1 Jul. 20, 2017

(30) Foreign Application Priority Data
Jan. 20, 2016 (JP) .................................. 2016-8776

(51) Int. Cl.
*H02M 3/156* (2006.01)
*H02M 1/32* (2007.01)
*H02M 1/08* (2006.01)
*H02M 3/158* (2006.01)
*H02M 1/00* (2006.01)

(52) U.S. Cl.
CPC ............. *H02M 3/156* (2013.01); *H02M 1/08* (2013.01); *H02M 1/32* (2013.01); *H02M 3/158* (2013.01); *H02M 2001/0009* (2013.01)

(58) Field of Classification Search
CPC .. H02M 2001/322; H02M 3/156; H02M 1/32; H02M 2001/0009; H02M 1/44; H02M 1/14; H02M 1/42; H02M 1/08; H02M 2001/327; H02M 3/06; H02H 9/043; H02H 9/04; H02H 7/1252
See application file for complete search history.

(56) References Cited

U.S. PATENT DOCUMENTS

| 6,249,411 B1* | 6/2001 | Hemena ................... H02J 1/108 361/18 |
| 6,301,131 B1 | 10/2001 | Yoshida |
| 9,220,138 B1* | 12/2015 | Zhang ................ H05B 33/0815 |
| 9,559,675 B1* | 1/2017 | Peng ...................... H03K 5/086 |
| 2002/0196644 A1* | 12/2002 | Hwang ............... H02M 1/0845 363/89 |
| 2005/0052886 A1* | 3/2005 | Yang ....................... H02M 1/36 363/49 |
| 2006/0279965 A1 | 12/2006 | Nakamura |

(Continued)

FOREIGN PATENT DOCUMENTS

JP 07-337007 A 12/1995
JP 08-266042 A 10/1996
(Continued)

*Primary Examiner* — Gustavo A Rosario-Benitez
(74) *Attorney, Agent, or Firm* — Posz Law Group, PLC

(57) ABSTRACT

A switching power supply device includes a switching element and a diode and generates an output voltage by supplying current to a coil by controlling the switching element to turn on and off. A current detection circuit detects a current flowing in the switching element. A voltage detection circuit monitors a voltage at an output terminal OUT. A control circuit controls the switching element to turn on and off by a current control mode based on a current detection signal and a feedback voltage. The control circuit drives a bleeder circuit to supply a load current to the output terminal when a level of the current detection signal is lower than a predetermined level.

9 Claims, 12 Drawing Sheets

(56) References Cited

U.S. PATENT DOCUMENTS

| | | | | |
|---|---|---|---|---|
| 2009/0167186 A1* | 7/2009 | Ghanem | ............ | H05B 33/0803 315/77 |
| 2014/0203791 A1* | 7/2014 | Lee | ......................... | G05F 1/468 323/282 |
| 2014/0210444 A1* | 7/2014 | Nakamura | ............... | H02M 1/08 323/283 |
| 2015/0288286 A1* | 10/2015 | Chu | .................. | H02M 3/33507 363/21.12 |
| 2015/0288288 A1* | 10/2015 | Chang | ............... | H02M 3/33523 363/21.16 |
| 2015/0357928 A1* | 12/2015 | Itakura | .................... | H02M 1/10 320/128 |
| 2016/0190931 A1* | 6/2016 | Zhang | .................. | H02M 3/1582 323/271 |
| 2016/0190941 A1* | 6/2016 | Kuang | .............. | H02M 3/33507 363/21.01 |
| 2017/0194858 A1* | 7/2017 | Villot | .................... | H02M 3/156 |

FOREIGN PATENT DOCUMENTS

| | | |
|---|---|---|
| JP | 2001-339953 A | 12/2001 |
| JP | 2006-149056 A | 6/2006 |
| JP | 2011-004466 A | 1/2011 |
| JP | 2014-045564 A | 3/2014 |

\* cited by examiner

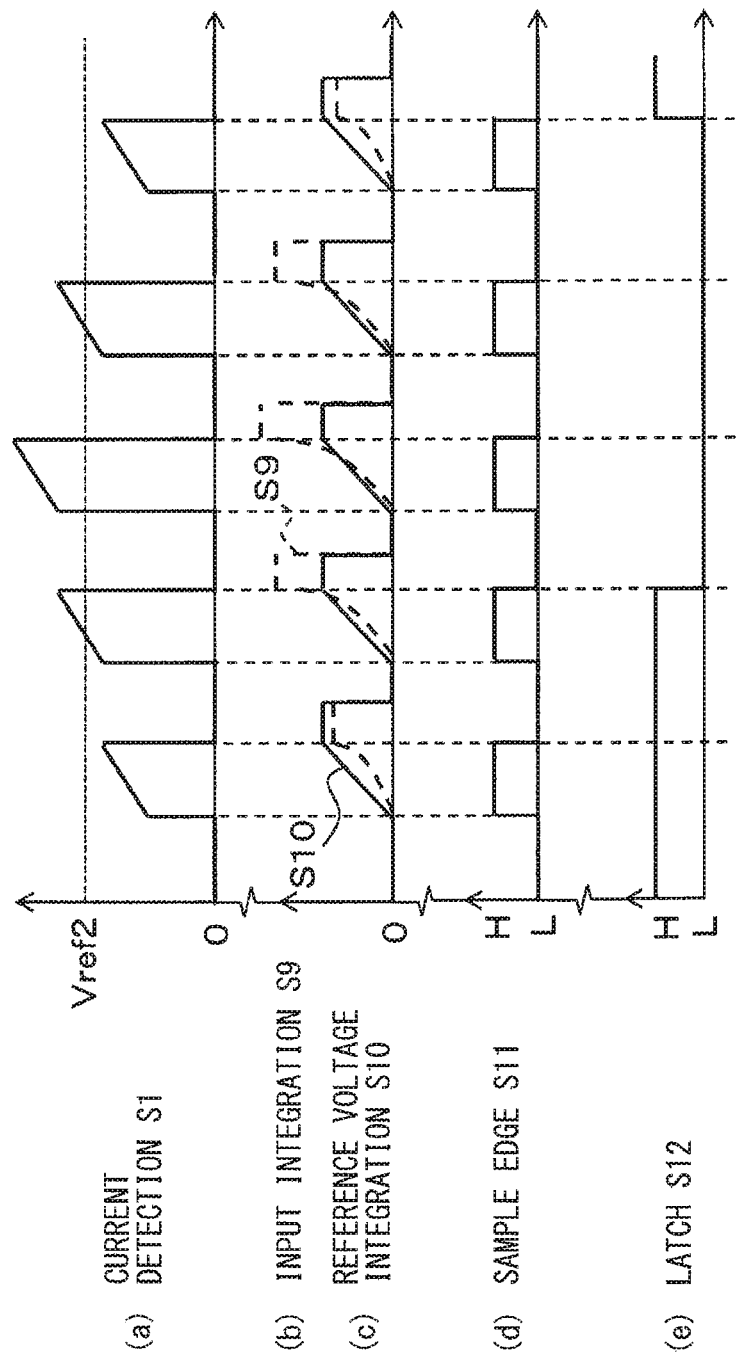

SWITCHING POWER SUPPLY DEVICE

CROSS REFERENCE TO RELATED APPLICATION

The present application is based on Japanese patent application No. 2016-8776 filed on Jan. 20, 2016, the whole contents of which are incorporated herein by reference.

FIELD

The present disclosure relates to a switching power supply device.

BACKGROUND

JP H07-337007 and JP 3250217 (U.S. Pat. No. 6,301,131) disclose conventional switching power supply devices. Some switching power supply devices perform a current feedback control in a case that a high frequency switching operation is required for size reduction of an inductance. In this case, it is necessary in the current feedback control to mask a current signal for a predetermined period to separate a current signal from noise in a control circuit. The switching power supply device of this type is configured to be driven at a duty, which is higher than a predetermined duty irrespective of magnitudes of input and output voltages and a load current.

In an extreme situation, the load current flowing to an output side decreases to be zero and hence a discontinuous operation is necessitated correspondingly. However, in a case that the switching power supply device has a low-side circuit configuration by diode rectification, it cannot perform the discontinuous operation. It is therefore necessary to supply the current through a bleeder resistor in correspondence to a decrease of the load current thereby stabilizing load operation.

Since the bleeder resistor for supplying the load current is an addition of a load, the current flowing in the bleeder resistor causes loss of power under a heavy load condition and causes heat generation.

SUMMARY

It is therefore an object to provide a switching power supply device, which reduces loss of power caused by a bleeder resistor in a configuration that a diode is provided at a low-potential side and a current mode control is performed.

According to one aspect, a switching power supply device is provided for supplying a current to a coil when a switching element is turned on and outputting a fly-wheeling current generated by the coil when the switching element is turned off to an output terminal through a diode. The switching power supply device comprises a current detection circuit, a voltage detection circuit, a control circuit and a bleeder circuit. The current detection circuit detects a current, which flows when the switching element is turned on, and outputs a current detection signal indicating a detected current. The voltage detection circuit generates a feedback voltage by monitoring a voltage at the output terminal. The control circuit controls the switching element to turn on and off by a current control mode based on the current detection signal of the current detection circuit and the feedback voltage of the voltage detection circuit. The bleeder circuit is connected to the output terminal for supplying a load current. The control circuit drives the bleeder circuit to thereby supply the load current to the output terminal when a level of the current detection signal of the current detection circuit is lower than a predetermined level.

BRIEF DESCRIPTION OF THE DRAWINGS

FIG. 13 is a time chart showing signals developed at various points in the sixth embodiment.

DETAILED DESCRIPTION OF EMBODIMENT

First Embodiment

Figure 1:
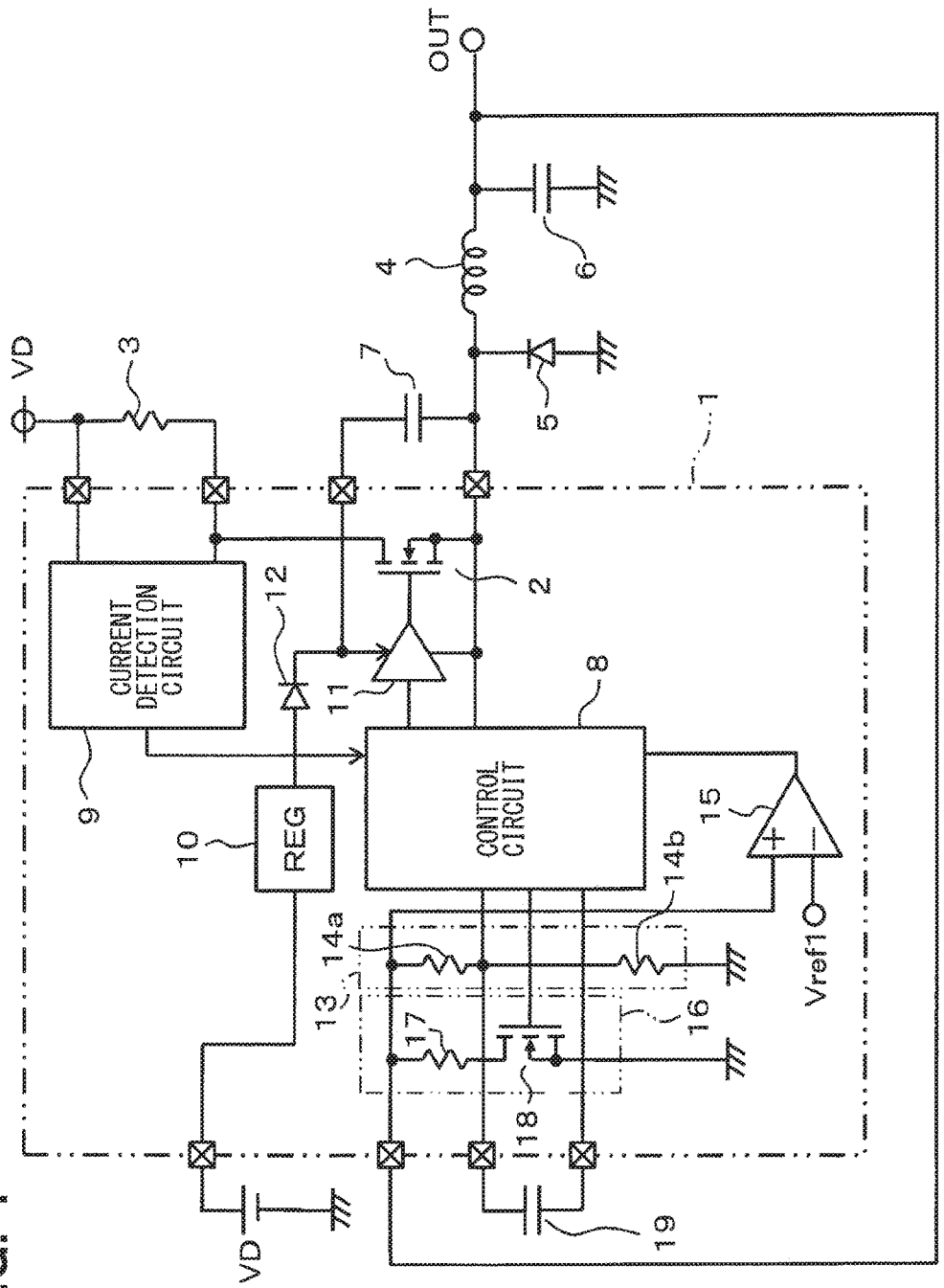
FIG. 1 is an electric circuit diagram showing a first embodiment of a switching power supply device.

Referring first to FIG. 1, a switching power supply device 1 is configured to include in its inside an N-channel MOSFET 2 as a switching element and circuits for controlling the MOSFET 2. The switching power supply device 1 is powered by a DC power source VD through a current detection resistor 3. In the switching power supply device 1, the MOSFET 2 is controlled to turn on and off to thereby supply current to a coil 4 and charge a capacitor 6 through a fly-wheeling diode 5. A terminal voltage of the capacitor 6 is an output voltage Vout of an output terminal OUT.

In the switching power supply device 1, a capacitor 7 is connected to the MOSFET 2 externally for a bootstrap operation. The switching power supply device 1 includes a control circuit 8 as a main part and further a current detection circuit 9, a power supply circuit 10 and the like. The power supply circuit 10 is a voltage regulator, which deboosts the DC voltage supplied from the DC power source VD to generate an internal operation power source. The MOSFET 2 receives a gate voltage from the control circuit 8 through a gate driving circuit 11. Power is supplied to the gate driving circuit 11 from the power supply circuit 10 through a forward-biased diode 12 which is provided to prevent reverse flow of current. The power supply circuit 10 supplies power to the capacitor 7, which is a power supply source for the gate driving circuit 11, and charges the capacitor 7 to a predetermined voltage.

The current detection circuit 9 receives an inter-terminal voltage of the current detection resistor 3 and applies it to the control circuit 8 as the current detection signal. The switching power supply device 1 further includes a voltage detection circuit 13, which detects the output voltage Vout of the output terminal OUT. The voltage detection circuit 13 is a series circuit formed of resistors 14a and 14b. A common node of the resistors 14a and 14b is connected to the control circuit 8 as a voltage detection signal. The output voltage Vout is inputted to a non-inverting input terminal of a comparator 15. The comparator 15 compares the output voltage Vout with a first reference voltage Vref1 inputted to its inverting input terminal. The comparator 15 applies a detection signal of a high level to the control circuit 8 when the output voltage Vout exceeds the reference voltage Vref1. In this case, the level of the reference voltage Vref1 is set to correspond to a set value of the output voltage Vout.

The switching power supply device 1 further includes a bleeder circuit 16. The bleeder circuit 16 is connected to the output terminal OUT and is a series circuit formed of a bleeder resistor 17 and an N-channel MOSFET 18. The MOSFET 18 receives at its gate a driving signal from the control circuit 8. A capacitor 19 is connected externally to the switching power supply device 1 for phase compensation.

Figure 2:
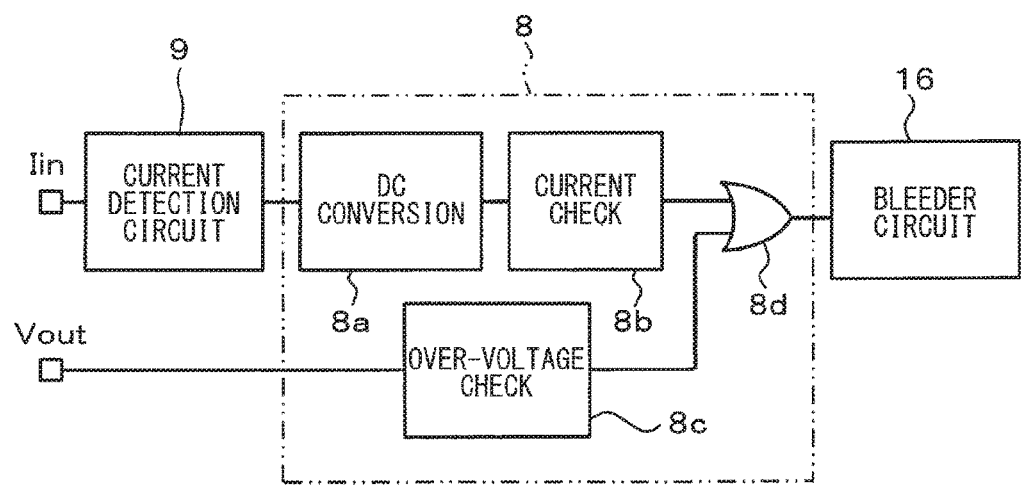
FIG. 2 is a functional block diagram for driving a bleeder circuit in the first embodiment.

FIG. 2 shows a functional block configuration of the control circuit 8, which controls driving of the MOSFET 18 of the bleeder circuit 16. The control circuit 8 includes a DC conversion part 8a, a current check part 8b, an over-voltage check part 8c and an OR logic part 8d. The DC conversion part 8a receives the current detection signal from the current detection circuit 9 and converts it to a DC detection signal, which indicates a current level of the current Iin flowing in the resistor 3. The current check part 8b checks whether a current level indicated by the DC detection signal decreases to be lower than a predetermined level and outputs a determination signal of a high level when the current level is lower than the predetermined level. The over-voltage check part 8c checks whether the output voltage Vout of the output terminal OUT is an over-voltage level, which is predetermined, and outputs a determination signal of a high level when the output voltage Vout is the over-voltage.

When the determination signal of the high level is outputted from either one of the current check part 8b and the over-voltage check part 8c, a driving signal is outputted to the bleeder circuit 16 through the OR logic part 8d. Upon receiving the driving signal, the MOSFET 18 of the bleeder circuit 16 is turned on to supply a load current from the output terminal OUT through the bleeder resistor 17 and the MOSFET 18.

Figure 3:
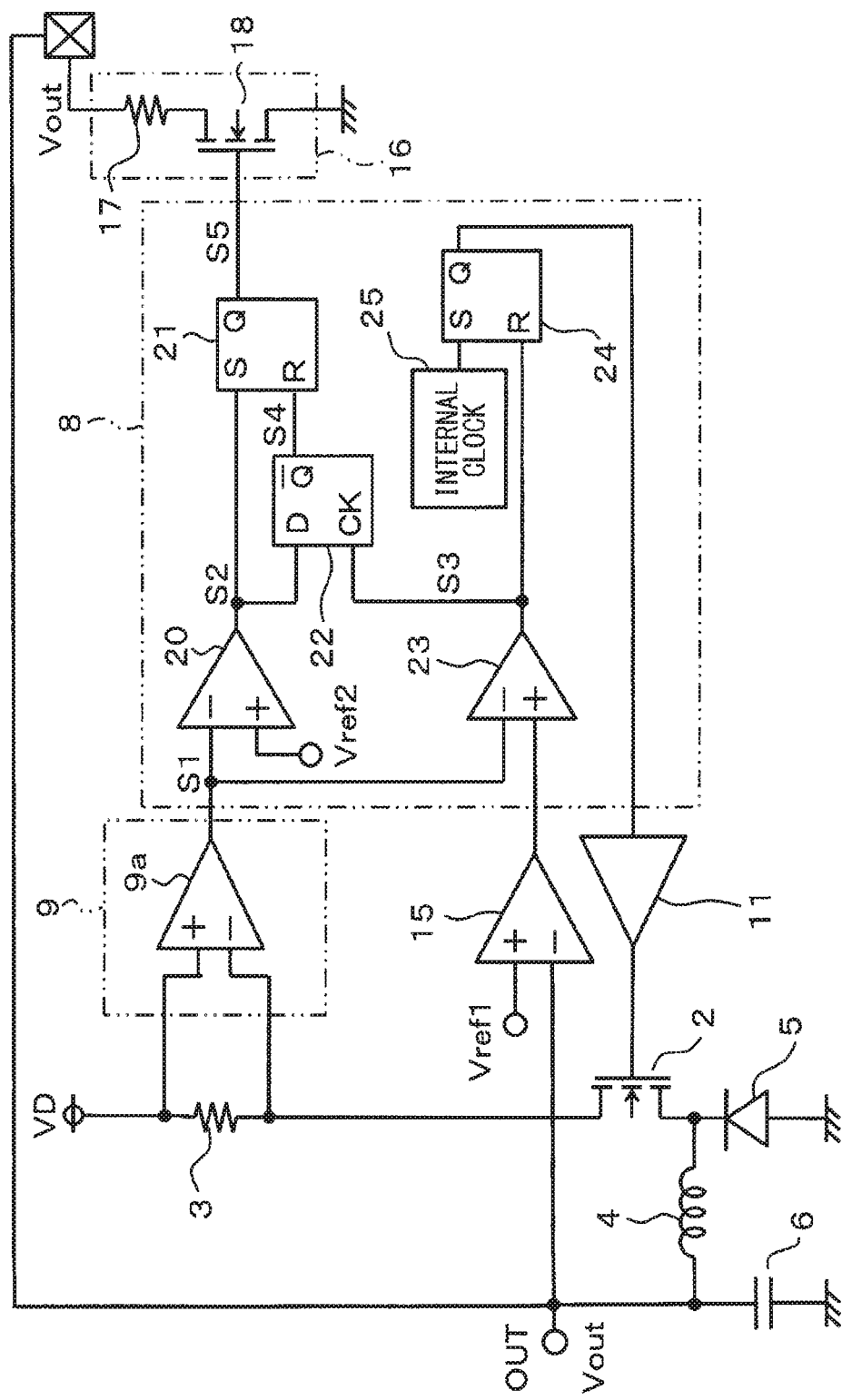
FIG. 3 is an electric circuit diagram showing a control circuit as a main part in the first embodiment.

FIG. 3 shows one example of a detailed configuration of the control circuit 8. In this configuration, the current detection circuit 9 includes an operational amplifier 9a and amplifies the terminal voltage of the current detection resistor 3 to output it as the current detection signal. In the control circuit 8, a comparator 20 receives the current detection signal from the current detection circuit 9 at its inverting input terminal and a second reference voltage Vref2 at its non-inverting input terminal. The second reference voltage Vref2 is set to a voltage corresponding to a current level, which is provided for detecting a low-load current flow status.

An output signal of the comparator 20 is inputted to a set terminal S of a set-reset (S-R) flip-flop 21 provided as a latch circuit and to an input terminal D of a D-type flip-flop 22. An output terminal Q of the S-R flip-flop 21 is connected to a gate of the MOSFET 18 of the bleeder circuit 16 to apply the gate driving signal. A comparator 23 receives the output signal of the current detection circuit 9 at its inverting input terminal and the output signal of the comparator 15, which detects the over-voltage.

The comparator 23 outputs a signal of high level to a reset terminal R of the S-R flip-flop 21 when the level of the current detection signal outputted from the current detection circuit 9 decreases to be lower than a level of an input signal inputted from the comparator 15. The comparator 23 applies an output signal to a clock terminal CK of a D-type flip-flop 22. An S-R flip-flop 24 receives a clock signal from an internal clock 25 at a set terminal S and an output terminal Q in the S-R flip-flop 24 and its output signal at terminal Q is inputted to the gate driving circuit 11.

Figure 4:
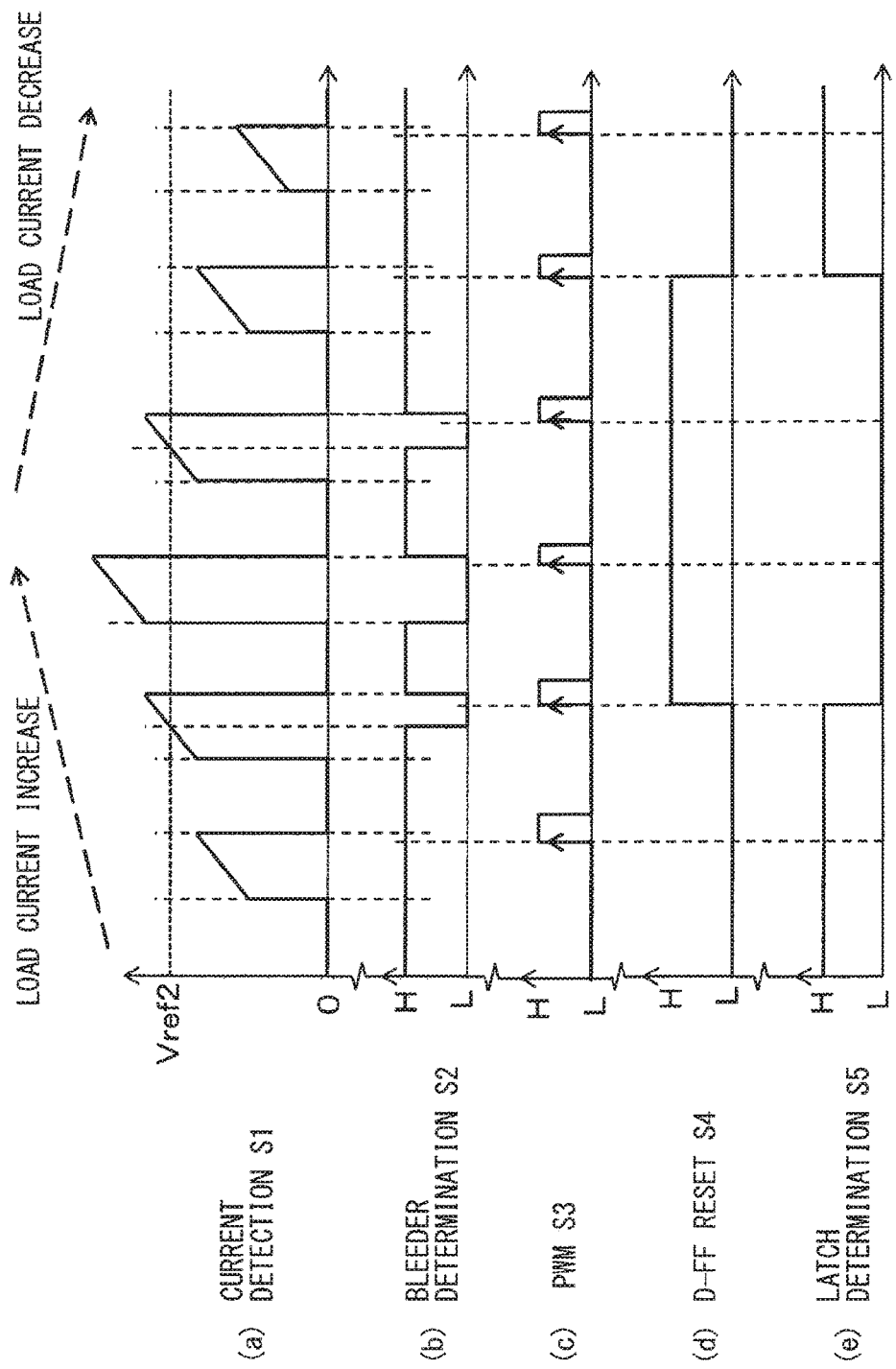
FIG. 4 is a time chart showing signals developed at various points in the first embodiment.

An operation of the above-described configuration will be described with reference to FIG. 4. FIG. 4 shows signal changes (a) to (e) in respect to time at various points in FIG. 3. In FIG. 4, (a) shows the current detection signal S1 outputted from the current detection circuit 9. The current flowing in the MOSFET 2 gradually increases and then decreases with time. Since the current detection signal S1 detects the current flowing when the MOSFET 2 is driven to perform switching operation by a PWM signal, it shows that the current flows intermittently.

In FIG. 4, (b) shows a bleeder determination signal S2, which indicates a result of comparison of the current detection signal S1 and the second reference voltage Vref2 by the comparator 20. When the level of the current detection signal S1 is low, the load current is low. The MOSFET 2 is driven to turn on at the duty larger than the predetermined ratio. For this reason, as the load current decreases, the capacitor 6 tends to be charged excessively. As a result, the output voltage Vout of the output terminal OUT gradually increases and reaches the over-voltage.

When the level of the current detection signal S1 is lower than the reference voltage Vref2, the comparator 20 outputs the bleeder determination signal of high level. As shown in (c) of FIG. 4, the PWM signal S3 outputted from the comparator 23 is inputted to the clock terminal CK of the D-type flip-flop 22.

The D-type flip-flop 22 thus outputs, as shown in (d) of FIG. 4, an inverted signal of the signal S2 inputted to the input terminal D at the timing when the input signal S3 changes to the high level. The output signal of the D-type flip-flop 22 is inputted to the reset terminal R of the S-R flip-flop 21 as a reset signal S4.

As shown in (e) of FIG. 4, the S-R flip-flop 21 outputs a latch determination signal S5 to the bleeder circuit 16 in response to the bleeder determination signal S2 and the reset signal S4. When the level of the current detection signal S1 is lower than that of the reference voltage Vref2, a latch determination signal S5 is latched to be the high level. When the level of the current detection signal S1 becomes higher than the reference voltage Vref2, the latch determination signal S5 returns to the low level.

As a result, the bleeder circuit 16 operates to decrease the output voltage Vout by supplying the load current to the output terminal OUT through the bleeder resistor 17 when the gate signal of high level is applied to the MOSFET 18. Since the discharging is stopped by the bleeder circuit 16 in a period, in which the load current increases, loss of power caused by the bleeder resistor 17 of the bleeder circuit 16 is decreased to be as little as possible.

When the voltage detection signal corresponding to the output voltage Vout of the voltage detection circuit 13 increases to the signal level corresponding to the over-voltage, the control circuit 8 turns on the MOSFET 18 of the bleeder circuit 16 to thereby decrease the output voltage Vout for protection. This operation is controlled by the control circuit 8 in correspondence to a case, in which the output voltage Vout increases in response to a rapid variation of the load connected to the output terminal OUT.

According to the first embodiment, the control circuit 8 determines a state that the level of the current detection signal S1 of the current detection circuit 9 decreases and the load current decreases and latches this state. The control circuit 8 thus discharges the capacitor 6 from the output terminal OUT by the bleeder circuit 16. It is thus possible to suppress the over-voltage by discharging electricity of the capacitor 6 by the bleeder circuit 16 when consumption of the load current is low and prevent loss of power by stopping discharging of the capacitor 6 by the bleeder circuit 16 when the load current increases.

It is also possible to avoid any disadvantage caused by the over-voltage by discharging by the bleeder circuit 16 even when the output voltage Vout rapidly changes to increase. As a result, it is possible to control the output voltage Vout of the output terminal OUT stably and efficiently.

Second Embodiment

Figure 5:
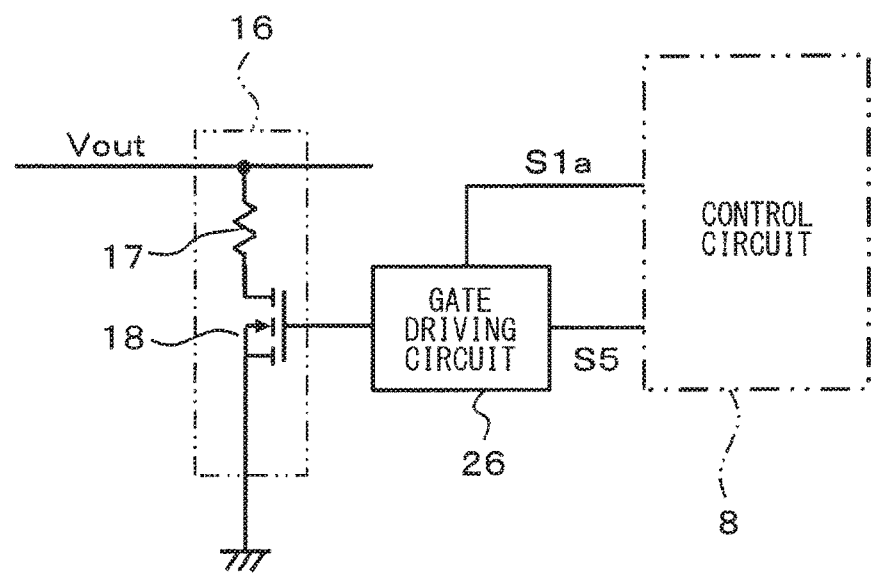
FIG. 5 is an electric circuit diagram showing a second embodiment of the switching power supply device partly.
Figure 6:
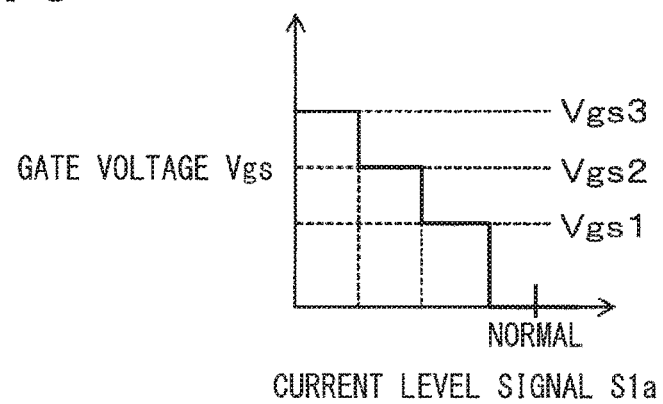
FIG. 6 is a graph showing an operation of the second embodiment.

FIG. 5 and FIG. 6 show a second embodiment. The second embodiment will be described with respect to differences from the first embodiment. In the second embodiment, as shown in FIG. 5, a gate driving circuit 26 is provided for driving the bleeder circuit 16 under control of the control circuit 8. The gate driving circuit 26 receives, in addition to the latch determination signal S5 from the control circuit 8, a current level signal S1$a$, which corresponds to a current level generated from the current detection signal S1.

Since it is normal when the current detection signal S1 is larger than the reference voltage Vref2, the latch determination signal S5 is at the low level. On the contrary, when the latch determination signal S5 becomes high, that is, the load current is decreased, the MOSFET 18 is not turned on but the gate voltage Vgs is changed.

As shown in FIG. 6, the gate voltage Vgs is changed in plural different levies in accordance with the magnitude of the current level signal S1$a$, which corresponds to the current level of the current detection signal S1. The gate driving circuit 26 increases the gate voltage Vgs to Vgs1, Vgs2, Vgs3 (>Vgs2>Vgs1) in steps as the current detection level signal S1$a$ decreases from the normal level.

Thus the MOSFET 18 increases the current supplied to the bleeder resistor 17 as the gate voltage Vgs increases. As a result, a quantity of discharging by the bleeder circuit 16 is controlled appropriately in accordance with a level of decrease of the load current.

According to the second embodiment, it is possible to control the discharging of electricity by the bleeder circuit 16 in addition to the operation and advantage of the first embodiment.

Third Embodiment

Figure 7:
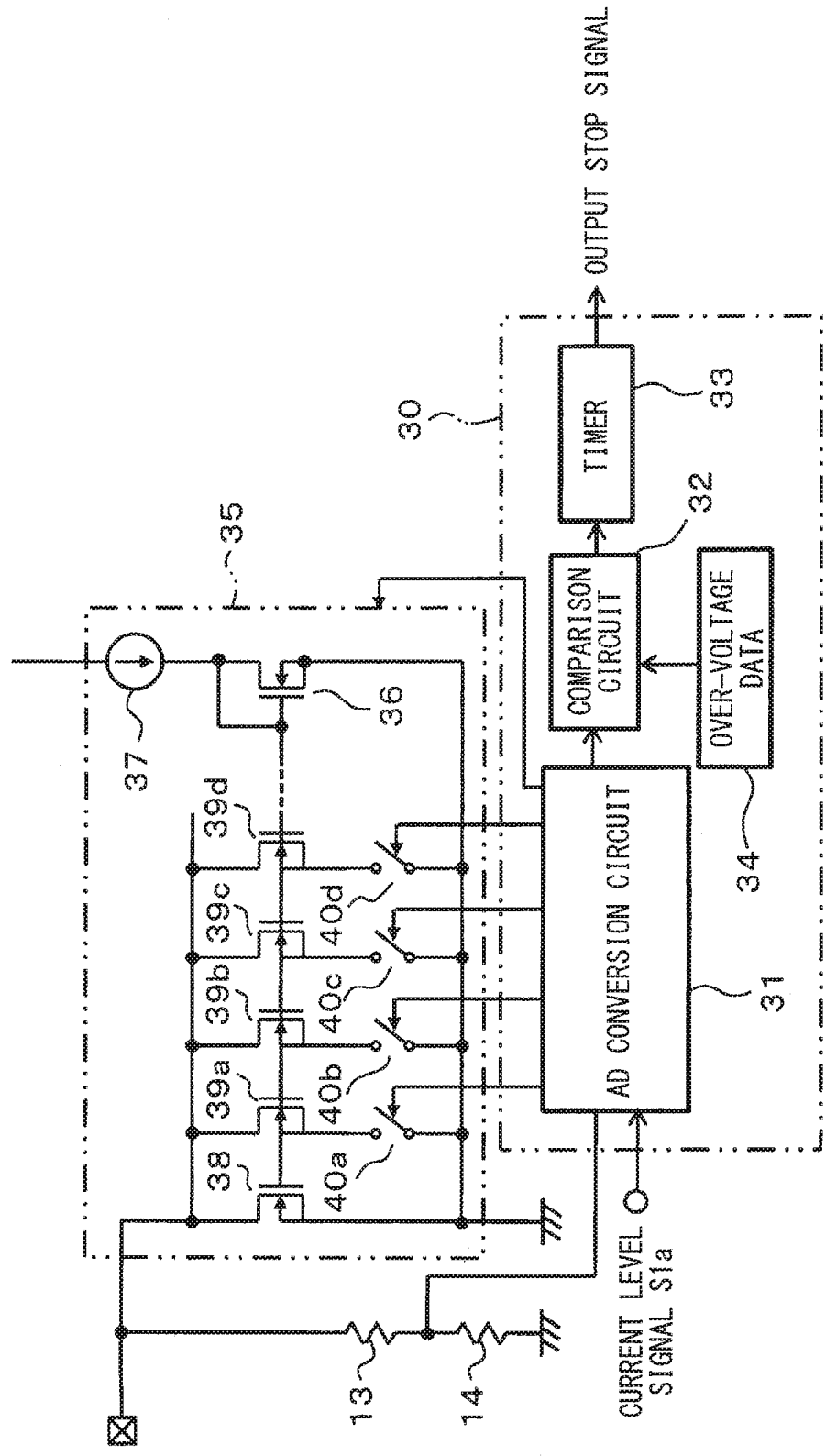
FIG. 7 is an electric circuit diagram showing a third embodiment of the switching power supply device partly.
Figure 8:
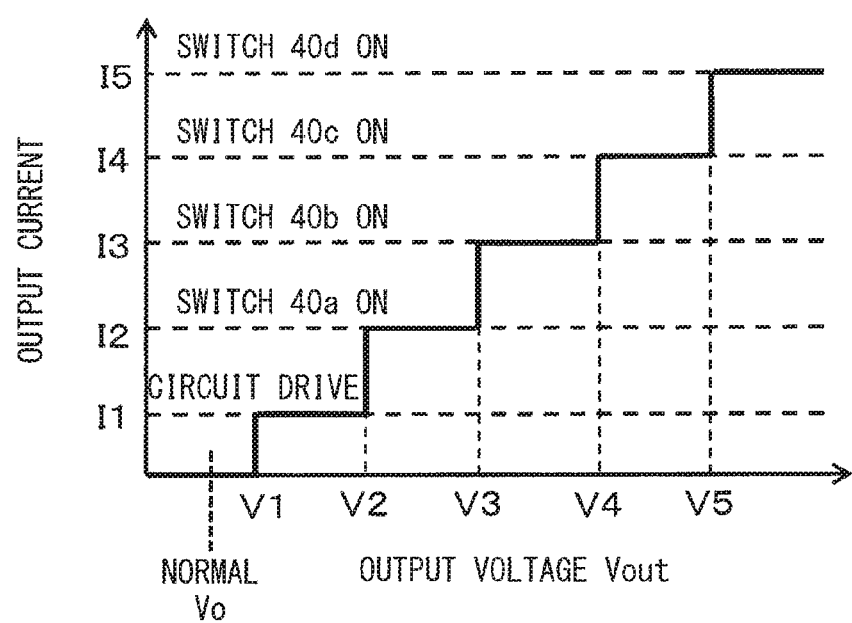
FIG. 8 is a graph showing an operation of the third embodiment.

FIG. 7 and FIG. 8 show a third embodiment. The third embodiment will be described with respect to differences from the second embodiment. In the third embodiment, as shown in FIG. 7, the control circuit 8 further includes a protection circuit 30. The protection circuit 30 includes an AD conversion circuit 31, a comparison circuit 32, a timer 33 and an over-voltage data storing part 34. The AD conversion circuit 31 receives the voltage detection signal of the voltage detection circuit 13 and converts its voltage level to a digital signal. The AD conversion circuit 31 outputs not only the digital signal to the comparison circuit 32 but also a signal, which varies the quantity of discharging by the bleeder circuit 35 in accordance with the level of the digital signal.

The comparison circuit 32 compares the level of the voltage detection signal with the over-voltage data supplied from the over-voltage data storing part 34. When a signal indicating the over-voltage is inputted from the comparison circuit 32, the timer 33 outputs an output stop signal, which stops current outputting of the MOSFET 2, when the over-voltage continues for a predetermine period.

The bleeder circuit 35 is configured to supply a constant current from a power source 37 to an N-channel MOSFET 36 and supplies a current from the output terminal OUT selectively by plural MOSFETs 38 and 39$a$ to 39$d$ forming a current mirror circuit with the MOSFET 36. The MOSFET 38 supplies the same current as the current of the MOSFET 36 when the MOSFET 36 is turned on. The MOSFETs 39$a$ to 39$d$ are connected in series with switches 40$a$ to 40$d$, respectively, which are controlled to turn on and off by the AD conversion circuit 31.

According to the third embodiment, the following operation is performed in accordance with the level of the voltage detection signal detected by the voltage detection circuit 13. That is, as shown in FIG. 8, the control circuit 8 does not drive the bleeder circuit 35 when the level of the voltage detection signal is in a normal voltage Vo. When the level of the voltage detection signal increases to the over-voltage V1, the control circuit 8 drives the bleeder circuit 35 to supply the output current I1 by the MOSFET 38.

When the level of the voltage detection signal further increases to over-voltages V2 to V5, the number of sequential selection of the switches 40$a$ to 40$d$ of the bleeder circuit 35 is increased by the signal of the AD conversion circuit 31. The output current is thus controlled to increase from 12 to 15. When the output voltage Vout of the output terminal OUT becomes the over-voltage, the bleeder circuit 35 operates to suppress the over-voltage by increasing the output current in steps in accordance with the level of the over-voltage.

When the output voltage reaches the over-voltage, the protection circuit 30 checks by the comparison circuit 32 whether the level of the over-voltage is an abnormal level. When the output voltage Vout continues to be the over-voltage for the predetermined period measured by the timer circuit 33, the protection circuit 30 applies the output stop signal to the control circuit 8. Thus, when the output voltage Vout continues to be in the over-voltage state, abnormality such as failure is determined and power supply operation is stopped.

Similarly to the second embodiment, the AD conversion circuit 31 is configured to supply the output current in accordance with the decrease in the load current based also on the level of the current detection signal S1$a$.

The third embodiment not only provides the same operation and advantage as the second embodiment but also the protection operation is performed by supplying the output current by the bleeder circuit 35 in further correspondence to the over-voltage of the output voltage Vout.

Fourth Embodiment

Figure 9:
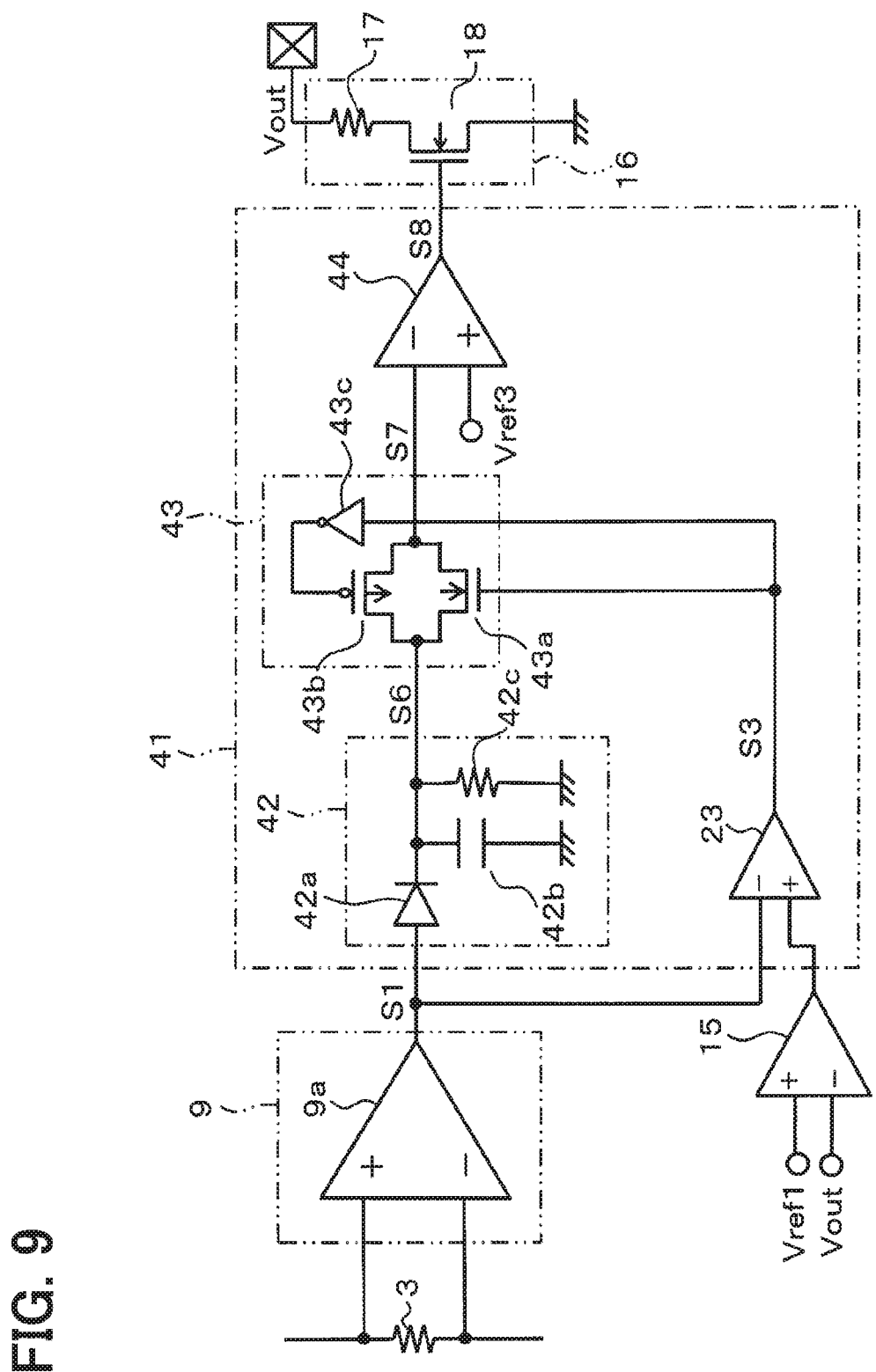
FIG. 9 is an electric circuit diagram showing a fourth embodiment of the switching power supply device partly.
Figure 10:
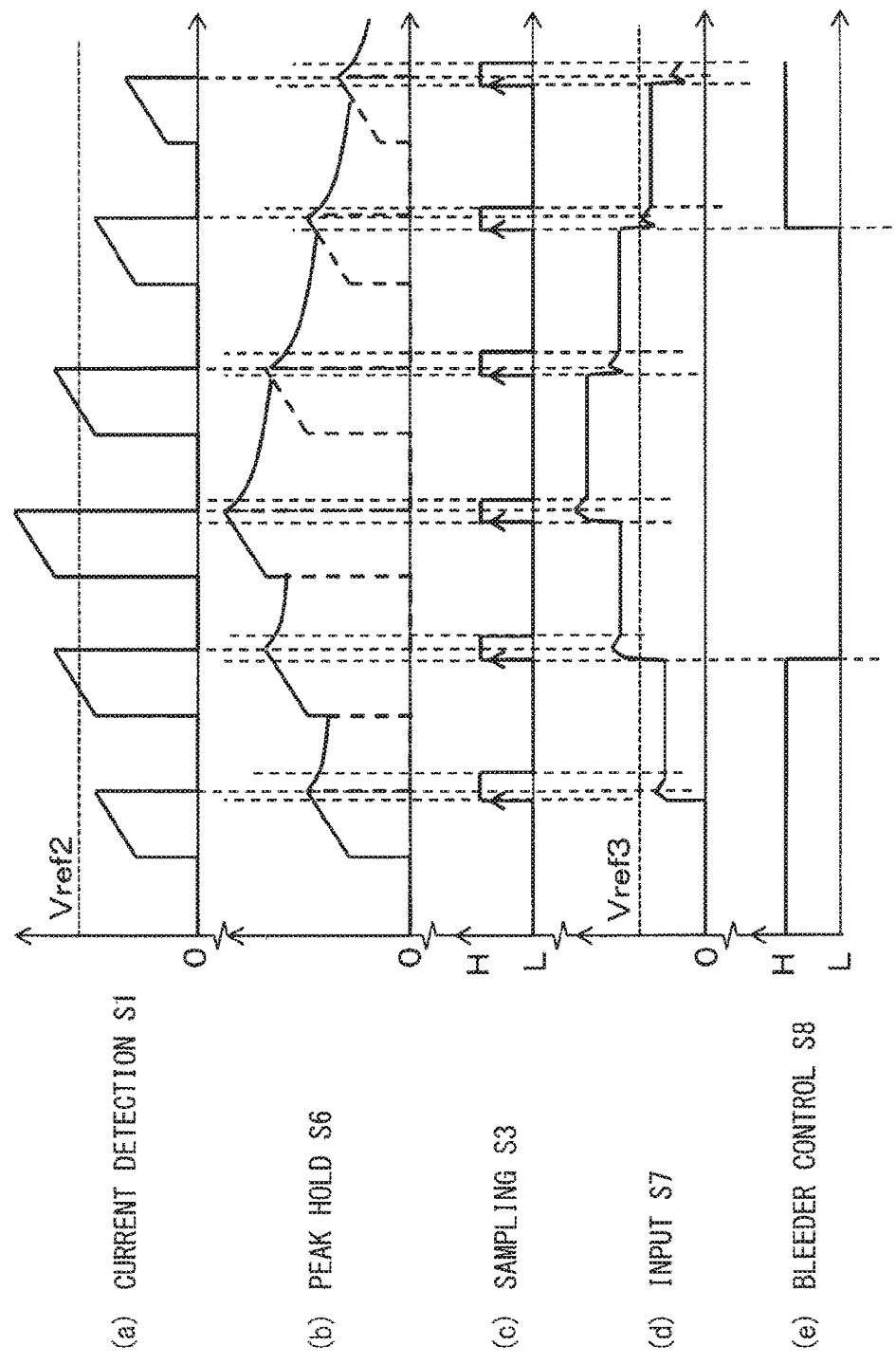
FIG. 10 is a time chart showing signals developed at various points in the fourth embodiment.

FIG. 9 and FIG. 10 show a fourth embodiment. The fourth embodiment will be described with respect to differences from the first embodiment. In the fourth embodiment, a peak hold circuit 42, a sampling circuit 43 and a comparator 44 are provided as a control circuit 41 for processing the current detection signal S1. The control circuit 41 includes a smoothing circuit. Specifically, the peak hold circuit 42 corresponds to the smoothing circuit. The peak hold circuit 42 includes a diode 42a, a capacitor 42b and a resistor 42c. The peak hold circuit 42 holds a peak value of the current detection signal S1 by charging the capacitor 42b through the diode 42a when the current detection signal S1 is inputted. A terminal voltage of the capacitor 42b of this time is outputted as a peak hold signal S6.

The sampling circuit 43 includes an analog switch, in which an N-channel MOSFET 43a and a P-channel MOSFET 43b are connected in parallel, and an inverter 43c, which applies an inverted signal to the P-channel MOSFET 43b. The MOSFET 43a receives the PWM signal S3 from the comparator 23 directly at its gate. The MOSFET 43b receives the PWM signal S3 through the inverter 43c at its gate. Thus a sampling signal S7 is outputted by sampling the peak hold signal S6 inputted from the peak hold circuit 42 in response to the PWM signal S3.

The sampling signal outputted from the sampling circuit 43 is inputted to the comparator 44 as an input signal S7 and compared with a third reference voltage Vref3. A comparison result is outputted as a bleeder control signal S8. The comparator 44 outputs the bleeder control signal of high level when the level of the input signal is lower than the reference voltage Vref3. When the bleeder signal S8 of high level is applied, the MOSFET 18 is turned on to supply the load current from the output terminal OUT.

An operation of the fourth embodiment will be described with reference to FIG. 10. FIG. 10 shows signal changes (a) to (e) in respect to time at various points in FIG. 9. In FIG. 10, (a) shows the current detection signal S1 outputted from the current detection circuit 9. Similarly to the first embodiment described above, the current flowing in the MOSFET 2 gradually increases and then decreases with time. Since the current detection signal S1 detects the current flowing when the MOSFET 2 is driven to perform switching operation by the PWM signal, it shows that the current flows intermittently.

In FIG. 10, (b) shows the peak hold signal S6, which is held in the peak hold circuit 42 as the peak value of the current detection signal. Contrary to the level of the current detection signal S1 changing to zero, the peak hold signal S6 gradually decreases from the peak value in correspondence to discharging of the capacitor 42b.

The sampling circuit 43 receives the PWM signal S3, which is the output of the comparator 23, as shown in (c) of FIG. 10. Thus, as shown in (d) of FIG. 10, the sampling circuit 43 outputs the input signal S6 for the analog switches 43a and 43b at the time of changing of the input signal to the high level. The sampling circuit 43 applies to the comparator 44 the input signal S7, which is the signal indicating the sampling result of holding the level of the input signal S6 applied when the input signal S3 changes to the low level.

When the sampled level of the input signal S7 is lower than the reference voltage Vref3, the comparator 44 outputs the bleeder control signal S8 of the high level. When the level of the input signal S7 increases to be higher than the reference signal Vref3, the comparator 44 outputs the bleeder control signal S8 of the low level.

As a result, when the gate signal of the high level is applied to the MOSFET 18, the bleeder circuit 16 operates to supply the load current from the output terminal OUT through the bleeder resistor 17 thereby to decrease the output voltage Vout. Since the discharging is stopped by the bleeder circuit 16 during a period of increase of the load current, the power loss in the bleeder resistor 17 of the bleeder circuit 16 is reduced as much as possible. As described above, the fourth embodiment also provides the similar operation and advantage as the first embodiment.

Fifth Embodiment

Figure 11:
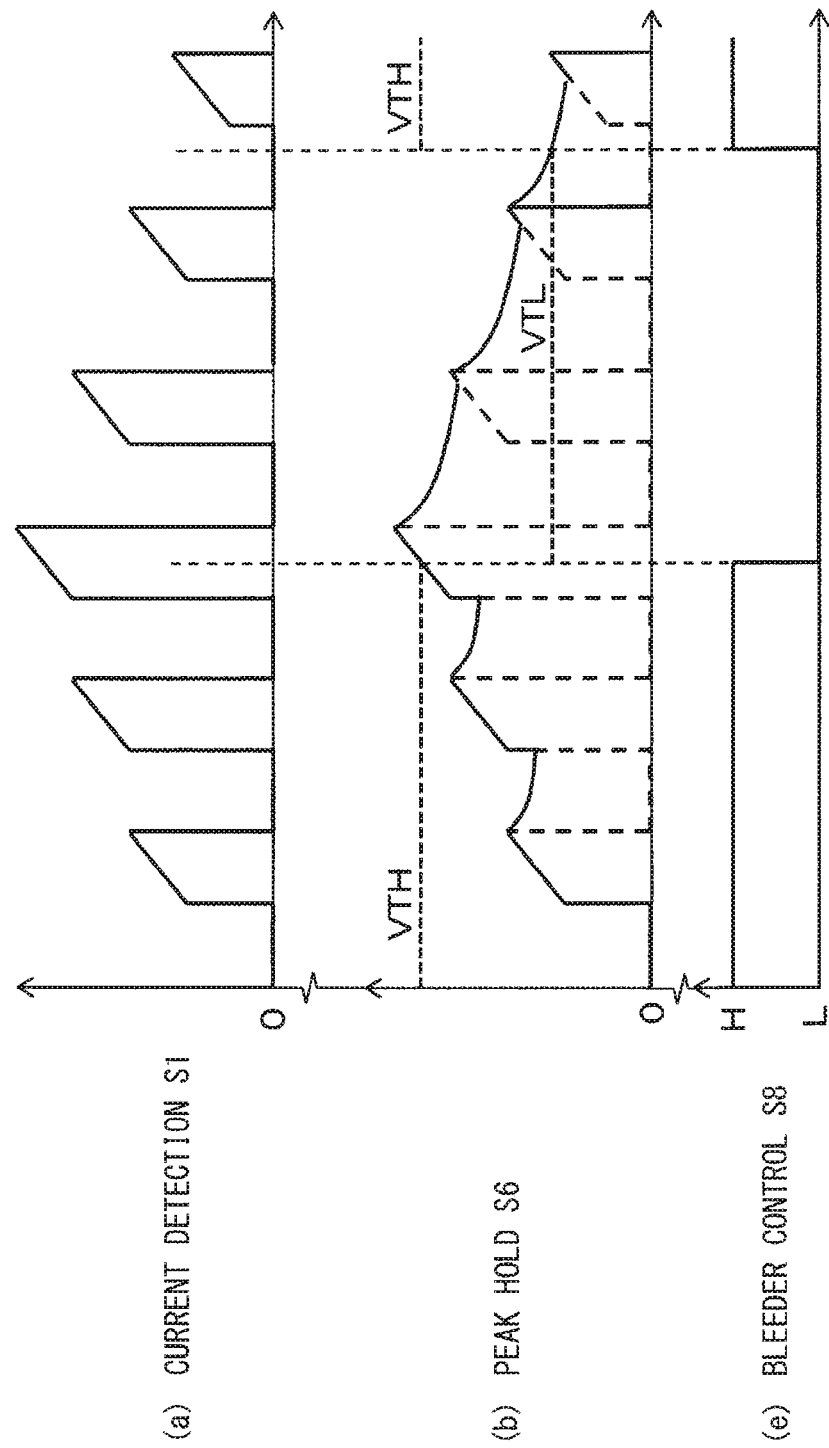
FIG. 11 is a time chart showing signals developed at various points in a fifth embodiment of the switching power supply device.

FIG. 11 shows a fifth embodiment. The fifth embodiment will be described with respect to differences from the fourth embodiment. In the fifth embodiment, the sampling circuit 43 in the configuration of FIG. 9 is removed and the comparator 44 is configured to have a hysteresis function. The comparator 44 has two reference voltages VTH and VTL, which are set to be high and low, respectively.

Thus the peak hold signal S6, which is outputted from the peak hold circuit 42, is inputted directly to the inverting input terminal of the comparator 44. As shown in (b) of FIG. 11, when the peak hold signal S6 increases from the low level to be higher than the reference voltage VTH, the comparator 44 outputs the bleeder control signal S8 of the low level. When the peak hold signal S6 decreases from high level to be lower than the reference voltage VTH, the comparator 44 outputs the bleeder control signal of the high level.

The comparator 44 having the hysteresis function holds the bleeder control signal S8 at the low level after the peak hold signal S6 increases to be higher than the reference voltage VTH until it decreases to be lower than the reference voltage VTL. Thus discharging by the bleeder circuit 16 is stopped. Thus the fifth embodiment also provides the similar advantage as the fourth embodiment.

Sixth Embodiment

Figure 12:
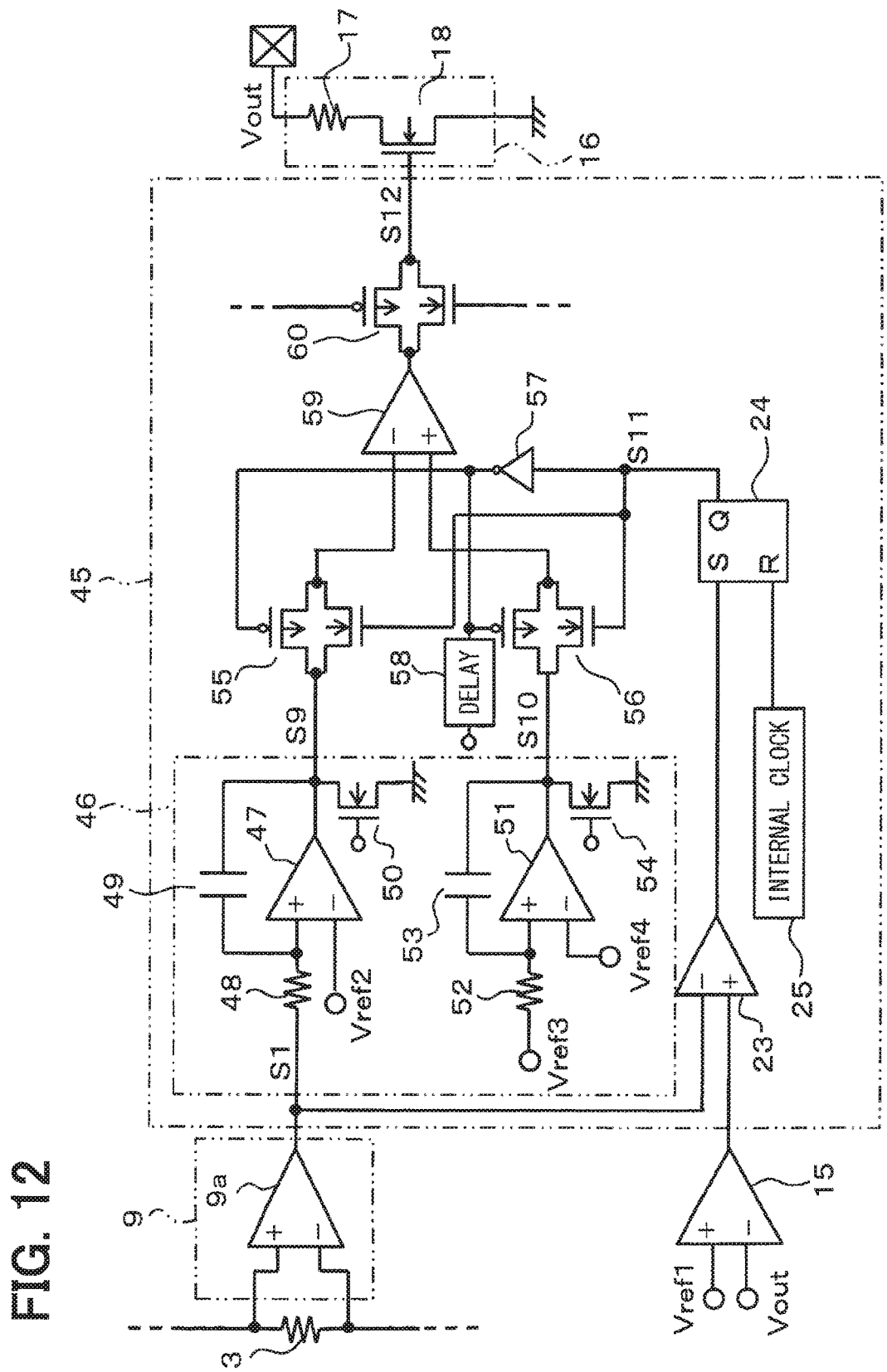
FIG. 12 is an electric circuit diagram showing a sixth embodiment of the switching power supply device.

FIG. 12 and FIG. 13 show a sixth embodiment. The sixth embodiment will be described with respect to differences from the fourth embodiment.

In the sixth embodiment, an integration circuit 46 is provided as a control circuit 45 for processing the current detection signal S1. The integration circuit 46 is for conversion to a DC voltage. The control circuit 45 has a function of the smoothing circuit. Specifically, the integration circuit 46 corresponds to the smoothing circuit. The integration circuit 46 includes, as an integration circuit part for integrating the current detection signal S1, an amplifier 47, an input resistor 48, a feedback capacitor 49 and a MOSFET 50 for discharging. An integration circuit part, which integrates the reference voltage Vref3, includes an amplifier 51, an input resistor 52, a feedback capacitor 53 and a MOSFET 54 for discharging.

The amplifier 47 inputs an input integration signal S9 to the analog switch 55 as a result of integration of the current detection signal S1. The amplifier 51 inputs a reference voltage integration signal S10 to the analog switch 56 as a result of integration of the reference voltage Vref3 of the predetermined level. Each analog switch 55, 56 receives a sample edge signal S11 directly at one terminal and through the inverter 57 at the other terminal. The output of the inverter 57 is also applied to the delay circuit 58. After a predetermined time from changing of the sample edge signal S11 to the low level, the MOSFETs 50 and 54 are turned on to discharge the capacitors 49 and 53, respectively.

The input integration signal S9 and the reference voltage integration signal S10, which are output signals of the analog switches 55 and 56, are inputted to the comparator 58. When the level of the input integration signal S9 is lower than the level of the reference voltage integration signal S10, the comparator 58 outputs a high level signal. This signal is applied to the bleeder circuit 16 through the analog switch 60 as a latch signal S12. When the latch signal S12 of the high level is applied, the MOSFET 18 turns on and the bleeder circuit 16 supplies the load current from the output terminal OUT.

An operation of the sixth embodiment will be described with reference to FIG. 13. FIG. 13 shows signal changes (a) to (e) in respect to time at various points in FIG. 12. In FIG. 13, (a) shows the current detection signal S1 outputted from the current detection circuit 9. Similarly to the fourth embodiment described above, the current flowing in the MOSFET 2 gradually increases and then decreases with time. Since the current detection signal S1 detects the current flowing when the MOSFET 2 is driven to perform switching operation by the PWM signal, it shows that the current flows intermittently.

In FIG. 13, (b) shows the input integration signal S9, which is produced by integrating the current detection signal S1 by the circuit 45. Since the current detection signal S1 linearly increases, the input integration signal resulting from integration of the current detection signal S1 increases in a quadratic curve and the integration value produced when the current value is zero is held. When the MOSFET 50 is turned on by the delay signal of the delay circuit 58, the capacitor 49 is discharged and the input integration signal S9 changes to zero level.

In FIG. 13, (c) shows the reference voltage integration signal S10, which is produced by integration of the reference voltage Vref3 by the circuit 45. Since the reference voltage Vref3 is fixed to the predetermined level with the same time period as the current detection signal S1, the reference voltage integration signal S10 produce by integration of the reference voltage Vref3 increases linearly and the integration value produced when the level of the reference voltage is zero is held. When the MOSFET 54 is turned on by the delay signal of the delay circuit 58, the capacitor 53 is discharged and the reference voltage integration signal S10 changes to zero level.

The input integration signal S9 and the reference voltage integration signal S10 outputted from the integration circuit 45 are inputted to the analog switches 55 and 56, respectively. The analog switches 55 and 56 are turned on at the time of falling of the sample edge signal S11, that is, at the time of falling of the current detection signal S1 to input the input integration signal S9 and the reference voltage integration signal S10 to the comparator 59. When the level of the input integration signal S9 is lower than the level of the reference voltage integration signal S10, the comparator 59 outputs a high level signal. When the level of the input integration signal S9 is higher than the level of the reference voltage integration signal S10, the comparator 59 outputs a low level signal. The output signal of the comparator 59 is outputted to the bleeder circuit 16 through the analog switch 60 as the latch signal S12.

As a result, the bleeder circuit 16 operates to supply the load current from the output terminal OUT through the bleeder resistor 17 to decrease the output voltage Vout when the gate signal of high level is applied to the MOSFET 18. The bleeder circuit 16 stops discharging while the load current continues to increase. Loss of power in the bleeder resistor 17 in the bleeder circuit 16 is reduced as much as possible. The sixth embodiment thus provides the similar operation and advantage as the fourth embodiment.

Other Embodiment

The switching power supply device 1 should not be limited to the embodiments described above but may be modified as exemplified below.

In the bleeder circuit 16, as means for discharging by the bleeder resistor 17, a bipolar transistor and an insulated gate bipolar transistor (IGBT) may be used. In place of discharging by the bleeder resistor 17, a transistor such as a MOSFET may be used to operate in its saturation region. In this case, the level of the load current supplied from the output terminal OUT may be regulated by varying the operation level of the transistor.

The bleeder circuit may be configured differently from the bleeder circuit 16 or 35. The bleeder circuit 35 may be configured to be used for discharging at either time of low load current or over-voltage. Further, it may be configured to discharge in steps by setting the level of the load current.

The configuration of the second embodiment and the third embodiment may be applied to the fourth embodiment or the fifth embodiment.

What is claimed is:

1. A switching power supply device for supplying an input current to a coil when a switching element is turned on and outputting a fly-wheeling current generated by the coil when the switching element is turned off to an output terminal through a diode, the switching power supply device comprising:
    a current detection circuit for receiving an inter-terminal voltage of a current detection resistor, which conducts only when the switching element is turned on, and outputting the inter-terminal voltage as a current detection signal;
    a voltage detection circuit for generating a feedback voltage by monitoring a voltage at the output terminal;
    a control circuit for controlling the switching element to turn on and off by a current control mode based on the current detection signal of the current detection circuit and the feedback voltage of the voltage detection circuit;
    a latch circuit included in the control circuit, operating as a smoothing circuit for converting the current detection signal, which is acquired when the switching element is turned on, to a signal corresponding to a current level of the current detection signal, and latching and maintaining the signal corresponding to the current level during a next off control time of the switching element; and
    a bleeder circuit connected to the output terminal for conducting a load current,
    wherein the control circuit drives the bleeder circuit to thereby conduct the load current from the output terminal when the signal corresponding to the current level of the current detection signal indicates that the current level of the current detection signal of the current detection circuit is lower than a predetermined level; and
    the current detection resistor is connected between a power supply and the switching element in a forward direction of the input current that is supplied from the power supply.

2. The switching power supply device according to claim 1, wherein:
    the bleeder circuit is configured to switch over a current level of the load current in plural steps; and
    the control circuit is configured to switch over the current level of the bleeder circuit in accordance with the level of the current detection signal of the current detection circuit lower than the predetermined level.

3. The switching power supply device according to claim 1, wherein:

the control circuit controls the bleeder circuit to supply the load current when the feedback voltage of the voltage detection circuit is an over-voltage level of the output terminal.

4. The switching power supply device according to claim 2, wherein:
the control circuit switches over a current level of the bleeder circuit in accordance with a level of an over-voltage when the feedback voltage of the voltage detection circuit is the over-voltage level of the output terminal.

5. A switching power supply device for supplying an input current to a coil when a switching element is turned on and outputting a fly-wheeling current generated by the coil when the switching element is turned off to an output terminal through a diode, the switching power supply device comprising:
a current detection circuit for receiving an inter-terminal voltage of a current detection resistor, which conducts only when the switching element is turned on, and outputting the inter-terminal voltage as a current detection signal;
a voltage detection circuit for generating a feedback voltage by monitoring a voltage at the output terminal;
a control circuit for controlling the switching element to turn on and off by a current control mode based on the current detection signal of the current detection circuit and the feedback voltage of the voltage detection circuit; and
a bleeder circuit connected to the output terminal for conducting a load current,
wherein
the control circuit drives the bleeder circuit to thereby conduct the load current from the output terminal when a level of the current detection signal of the current detection circuit is lower than a predetermined level,
the current detection resistor is connected between a power supply and the switching element in a forward direction of the input current that is supplied from the power supply,
the control circuit includes a smoothing circuit for converting the input current flowing in the switching element when the switching element is turned on to a signal corresponding to a current level, and
the smoothing circuit of the control circuit is provided by a peak hold circuit and a sampling circuit.

6. The switching power supply device according to claim 1, wherein:
the smoothing circuit of the control circuit is provided by an integration circuit.

7. The switching power supply device according to claim 1, wherein
the switching power supply device is configured to be powered by the power supply through the current detection resistor.

8. The switching power supply device according to claim 1, wherein
the current detection circuit is connected at a first terminal to a power supply and at a second terminal to the current detection resistor.

9. The switching power supply device according to claim 1, wherein
the switching element is a MOSFET,
a drain of the MOSFET is connected between the current detection circuit and the current detection resistor,
a gate of the MOSFET is connected to the control circuit, and
a source of the MOSFET is connected to the coil.

* * * * *